United States Patent [19]
Kloster

[11] 4,016,649
[45] Apr. 12, 1977

[54] CIRCULAR SAW GUIDE

[75] Inventor: James R. Kloster, Edina, Minn.

[73] Assignee: Kloster Pattern Company, Minneapolis, Minn.

[22] Filed: June 11, 1976

[21] Appl. No.: 695,012

[52] U.S. Cl. .................................. 30/373; 83/486; 83/745

[51] Int. Cl.$^2$ .......................................... B27B 9/04

[58] Field of Search ................... 83/486, 485, 745; 30/373

[56] References Cited

UNITED STATES PATENTS

| 1,885,087 | 10/1932 | DeWitt | 83/745 |
|---|---|---|---|
| 2,211,082 | 8/1940 | Smith | 83/486 |
| 2,676,624 | 4/1954 | Gecmen | 30/373 |
| 3,043,351 | 7/1962 | Davis | 30/373 |

Primary Examiner—Donald R. Schran
Attorney, Agent, or Firm—Orrin M. Haugen

[57] ABSTRACT

Guide frame means for portable powered saws and including a retainer means comprising a generally "U" shaped frame member having a pair of opposed lateral legs and a first cross-member extending between said opposed legs. An edge guide is coupled between said legs in opposed relationship to the cross-member, with the edge guide having a inwardly facing edge with an inwardly extending flange overlying the inwardly facing edge. Saw cradle means are mounted for adjustable positioning along the laterally extending legs, with the saw cradle means having an opening formed therein to accommodate a saw blade. Castor support means are mounted on the cross-member and are arranged to support the guide frame means at an elevation substantially along a plane through the work supporting surface of the inwardly extending flange.

7 Claims, 8 Drawing Figures

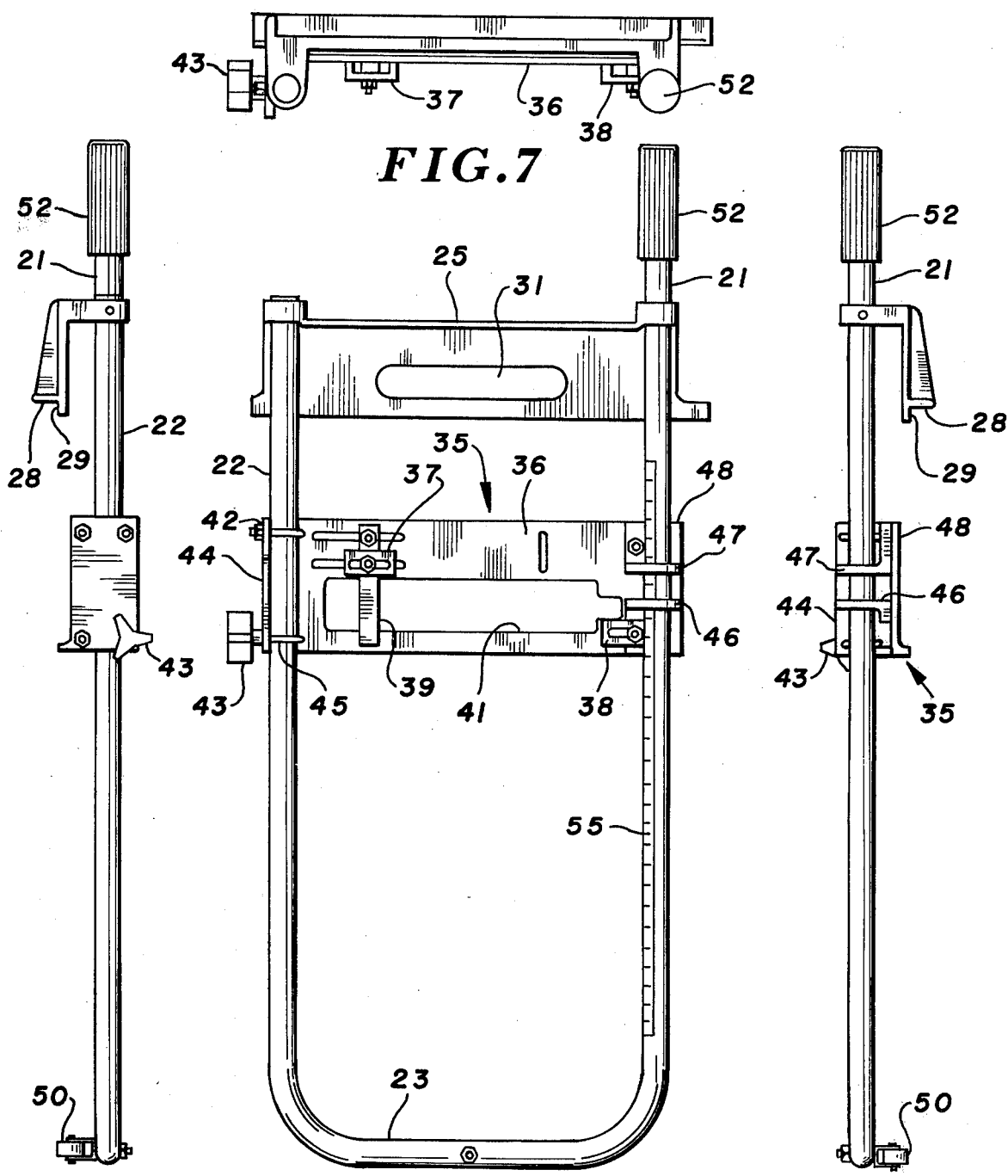
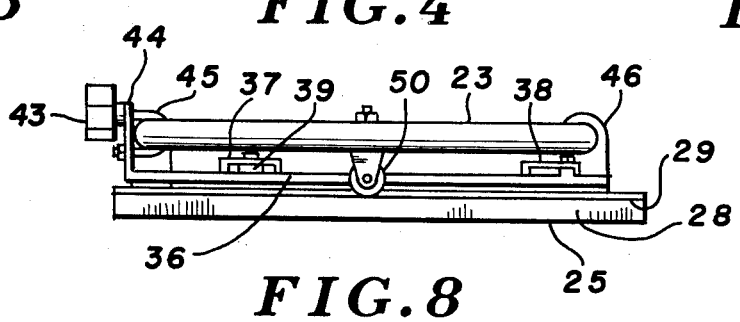
FIG.7 FIG.5 FIG.4 FIG.6 FIG.8

CIRCULAR SAW GUIDE

BACKGROUND OF THE INVENTION

The present invention relates generally to an improved guide frame means for portable power hand saws, and more specifically to such a device which is particularly adapted for the precision cutting of relatively large planar wooden panels. In the cutting of large wooden panels, such as plywood panels, pressed wood panels or the like, the carpenter frequently finds himself in an awkward disposition for the cutting of these panels, inasmuch as he may be compelled to stand an extended distance away from the saw, and guiding and proper operation of the saw becomes difficult. Powered hand saws of the circular saw type as well as the saber saw type are in wide use today, particularly in the construction field, and in the field of home redecorating and repair.

Plywood panels or pressed wood panels normally have a dimension of 4 × 8 feet, and occasionally may be of different lengths such as 4 × 7, or 4 × 16. These panels are available in various thicknesses, frequently between 3/16 inch and ¾ inch, although other thicknesses are also readily available.

The carpenter or home craftsman will ordinarily be required to cut the pre-fabricated panel to a desired size in order to fit the panel for its intended purpose. In the cutting of such a panel by use of a conventional powered hand saw, it is frequently necessary for the carpenter or home craftsman to move the saw along an extended distance, and guiding of the saw becomes difficult. As a result, the surface of the panel being cut may become slivered, or even worse, the saw may either bind or kick back (possibly both) and in many instances cause serious injury to the user. While these saws are normally provided with retractable guards, upon a rapid and unexpected kickback, there may be insufficient time for the guard to fall into place so as to protect the user from the rotating or oscillating blade, and as a result serious injuries have occurred. Examples of these serious injuries include severed arteries, severed veins, and other such injury.

The guide frame means of the present invention makes it possible for the home craftsman or carpenter to appropriately and accurately guide a powered hand saw along a predetermined path, normally parallel to one of the edges of the work piece, with the guide frame means supporting the saw at an appropriate level relative to the work, and permitting the saw to move along its predetermined path without danger of canting, or otherwise adversely reacting within the saw cut. As a result, the craftsman or carpenter may position himself adjacent the edge of the work, and merely move the saw forwardly along a path which parallels an edge of the panel, thereby completing his cut and fitting the work for its intended application. This operation may be conducted safely, and in the event any kickback occurs, the operator will be positioned so as to be free from contact with the rotating or oscillating blade.

SUMMARY OF THE INVENTION

Therefore, it is a primary object of the present invention to provide an improved guide frame means for portable powered hand saws which permits the preparation and completion of saw cuts along predetermined lines, with the operator being positioned laterally of the work, and with the saw being supported firmly in the guide frame means.

It is yet a further object of the present invention to provide an improved guide frame means for portable powered hand saws and including a cradle means supported between opposed lateral legs, and wherein the legs are provided with marking indicia for predetermining the cut line from the edge of the work.

It is yet a further object of the present invention to provide an improved guide means for portable powered hand saws which permits ripping of large dimensioned planar panels to a desired dimension.

Other and further objects of the present invention will become apparent to those skilled in the art upon a study of the following specification, appended claims, and accompanying drawings.

BRIEF DESCRIPTION OF THE DRAWINGS

FIG. 4 is a top plan view of the guide frame means of the present invention, with the portable powered hand saw removed therefrom;

FIGS. 5 and 6 are side elevational views of the guide frame means as illustrated in FIG. 4; and FIGS. 7 and 8 are end elevational views of the device illustrated in FIG. 4, with FIG. 7 being an end elevational view of the guide end, and with FIG. 8 being a view of the free-end thereof.

DESCRIPTION OF THE PREFERRED EMBODIMENT

Figure 1:
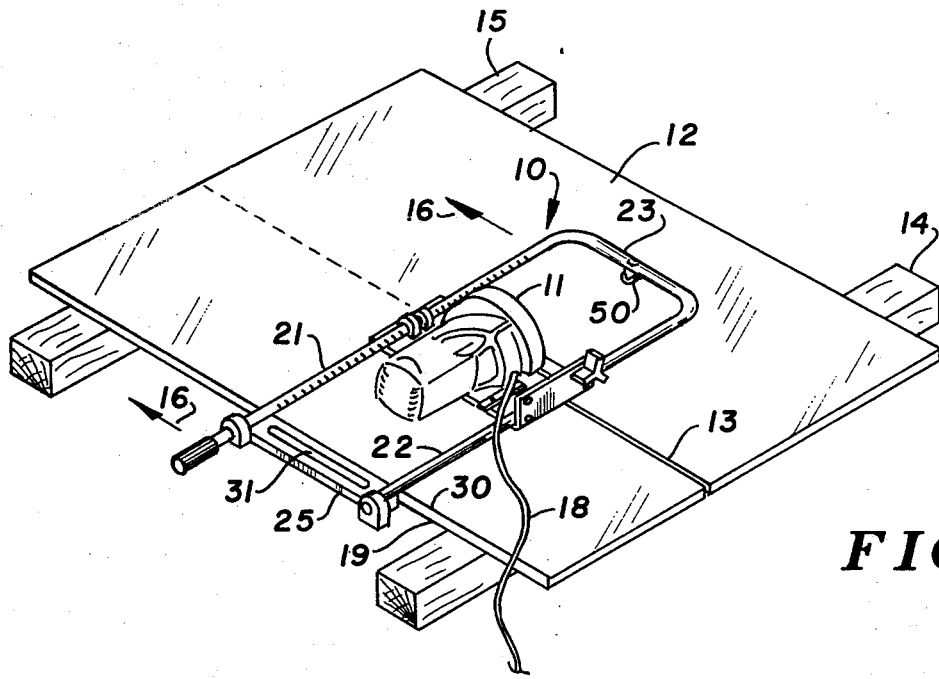
FIG. 1 is a perspective view of the guide frame means of the present invention holding a portable powered hand saw therewithin, and illustrating the assembly in a working disposition.

In accordance with the preferred embodiment of the present invention, and with particular attention being given to FIG. 1 of the drawings, it will be seen that the guide frame means generally designated 10 is provided with a portable powered hand saw 11 in mounted disposition therewithin, with the entire mechanism being utilized to rip plywood panel 12 along a cut line 13. The work 12 is supported along supports 14 and 15, and the mechanism is shown moving along the line and in the direction of the arrows 16—16. Power for the hand saw 11 is available, as conventional, from a power source (not shown) through electrical power cord or line 18.

In the operation illustrated in FIG. 1, the ripping along line 13 is accomplished from a predetermined distance from reference edge 19, with the cut line 13 being, of course, spaced an equal distance form reference edge 19 during the course of the ripping operation. As illustrated, powered hand saw 11 is in the form of a rotary or circular blade saw, however it will be appreciated that a powered saber saw may be employed with equal facility.

Figure 2:
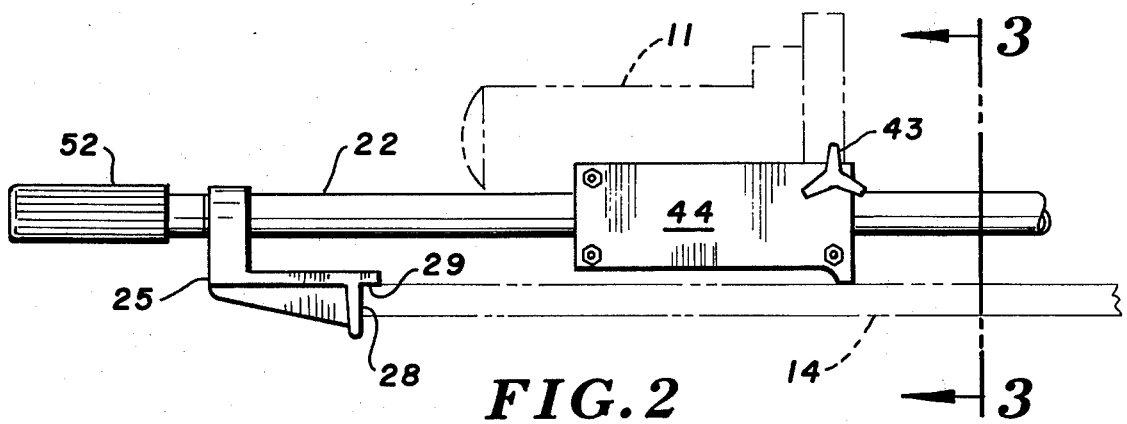
FIG. 2 is a front elevational view of the guide frame means of the present invention, and illustrating, in phantom, a portable powered hand saw retained therewithin.
Figure 3:
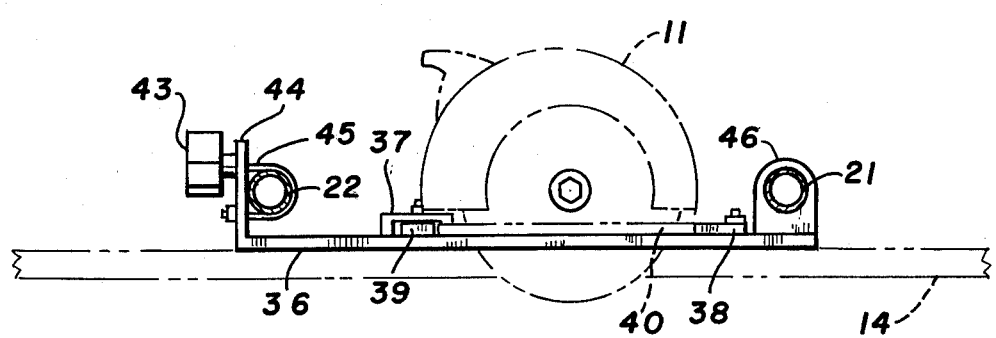
FIG. 3 is a vertical sectional view taken along the line and in the direction of the arrows 3—3 of FIG. 2, and further illustrating the portable powered hand saw in phantom therewithin.

With continued attention being directed to FIG. 1, and with attention being directed to FIGS. 2, 3 and 4 as well, it will be observed that guide frame means generally designated 10 includes a retainer means in the form of a generally "U" shaped member or frame having a pair of opposed lateral legs 21 and 22, and a first cross-member 23 which extends between legs 21 and 22, and is disposed, as indicated, at the outer free end thereof. An edge guide means as illustrated at 25 is provided which comprises a second cross-member which extends between legs 21 and 22, and is disposed in opposed relationship to cross-member 23. As is apparent in FIGS. 4, 5 and 6, as well as FIG. 8, the edge guide means 25 is provided with an inwardly facing edge as at 28, with the inwardly facing edge 28 having an inwardly extending flange in overlying relationship to the inwardly facing edge 28, as is illustrated at 29. The surface of inwardly extending flange 29 functions or performs as a work support surface and is, of course, in the arrangement illustrated in FIG. 1 being employed to support the distal end of the assembly on and along the upper edge surface of sheet or work 12, as at 30. Also, for purposes of guiding the assembly, a slot is formed as at 31 which can be used for hand gripping purposes.

The saw cradle means is shown generally at 35, and includes a cross-member or body 36 having portable powered hand saw clamping means thereon as at 37 and 38. Clamp 38 is in the form of a clamping shoe or the like and is utilized to retain the lower plate of a conventional circular powered hand saw, and clamping member 37 may be employed for the same purpose. A cross-member or clamping bar 39 is also provided, and may be employed for holding the plate or shoe of the powered hand saw in proper disposition for working. Saw cradle means 35 is also provided with a bore or saw receiving opening such as at 41. The clamping shoe arrangement 37 may also be utilized to support and retain a powered saber saw in place, with the clamping arrangement being, of course, suited for the individual saw to be retained therein. The arrangement illustrated provides substantially universal application for those portable powered hand saws in conventional use today.

With attention being directed to FIG. 3, it will be seen that clamps 37 and 38 are being utilized to grip or clamp the shoe member 40 of saw 11 firmly in place, with the arrangement being, of course, suitable for adaptation in connection with other conventionally and conveniently available portable powered hand saws.

The saw cradle means 35 is mounted for adjustable positioning along the lateral legs 21 and 22, with a clamping arrangement being illustrated as at 42. Clamping arrangement 42 consists of a clamping head 43 which works against side plate 44, and along gripping "U" bolt 45. U bolt 45, with member 43 snugged thereagainst, will grip the surface of leg 22 so as to retain the cradle in place. It has been found that the clamping arrangement is adequate on one leg only, and hence eyes 46 and 47 on guide portion 48 of saw cradle 35 are formed to slidably engage leg 21 therewithin.

At the outer free end of the guide frame means, such as along member 23, a support means is provided, such as at 50. Support means 50, preferably in the form of a castor or the like, is utilized to have a work engaging surface for supporting the guide frame means at a elevation substantially along a plane through the work supporting surface of the inwardly extending flange 29. Thus, movement of the guide frame means along the surface of the work is enhanced.

At the inner end of the guide frame means, there is preferably disposed and positioned a gripping handle 52 which is utilized by the operator or carpenter while the guide frame means is being moved along the extent of the work, such as in the operation illustrated in FIG. 1. Therefore, the handle 52 provides an additional means by which the operator may grip the guide frame means and move it along as deemed appropriate.

By way of providing appropriate in-leads and the like, the guiding surface of edge guide 28 may be slightly arced at the ends so as to provide smooth operation, without distracting from accuracy. Appropriate lead-ins may be provided, as deemed necessary or required, with a bellowing of approximately 1/16 inch being provided over a transverse length of approximately 2 inches being found workable.

As has been indicated, support means 50 is preferably in the form of a castor, however other sliding shoe means may be provided as deemed desirable.

Also, as indicated, a calibrating member may be provided along the extent of leg 21, such as is illustrated at 55, with this calibration strip being in inches, centimeters, or any other conventional system.

By way of materials of construction, cast aluminum has been found desirable for the edge guide means and for the saw cradle means, and aluminum tubing has been found desirable for use in the U shaped frame of the retainer means. Such material provides a light weight and durable system, however other materials of construction may be found useful.

I claim:
1. Guide frame means for portable powered hand saws and including:
   a. retainer means comprising a generally U shaped frame member having a pair of opposed lateral edges in a first cross-member extending between said legs and disposed at one end thereof;
   b. edge guide means comprising a second cross-member extending between said legs and disposed in opposed relationship to said first cross-member and having an inwardly facing edge with an inwardly extending flange overlying said inwardly facing edge, with said inwardly extending flange having a work support surface on the underside thereof;
   c. saw cradle means mounted for adjustable position along said lateral legs and having portable powered hand saw clamping means on the upper surface thereof, and having a saw receiving bore formed therethrough for accommodating a saw blade therein; and
   d. support means mounted upon said first cross-member and having a work engaging surface supporting said guide frame means at an elevation substantially along a plane through said work supporting surface of said inwardly extending flange.

2. The guide frame means as defined in claim 1 being particularly characterized in that said support means mounted on said first cross-member is a castor.

3. The guide frame means as defined in claim 1 being particularly characterized in that a gripping handle means is provided in extension of one of said opposed lateral legs.

4. The guide frame means as defined in claim 3 being particularly characterized in that gripping means are provided along said edge guide means.

5. The guide frame means as defined in claim 1 being particularly characterized in that a calibration scale is provided along one of said opposed lateral legs and defining a distance from said inwardly facing edge.

6. The guide frame means as defined in claim 1 being particularly characterized in that said saw cradle means are adapted to support a portable powered circular hand saw.

7. The guide frame means as defined in claim 1 being particularly characterized in that said saw cradle means has clamping means therealong for gripping one of said legs for releasably retaining said saw cradle means in predetermined disposition relative to said inwardly facing edge of said edge guide means.

* * * * *